Oct. 5, 1965
A. HOLMES
3,209,627
MACHINE TOOLS
Filed Sept. 7, 1961
11 Sheets-Sheet 1
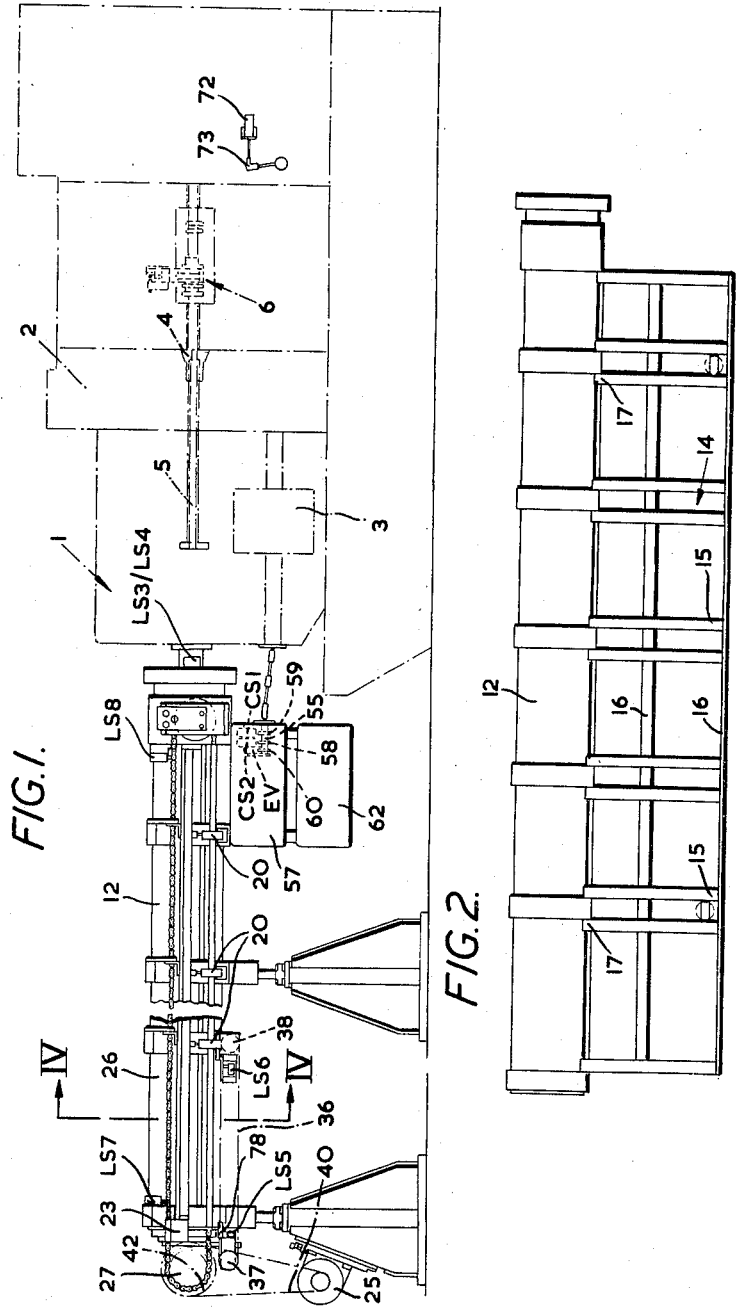
INVENTOR
ALFRED HOLMES
BY Irwin S. Thompson
ATTY.

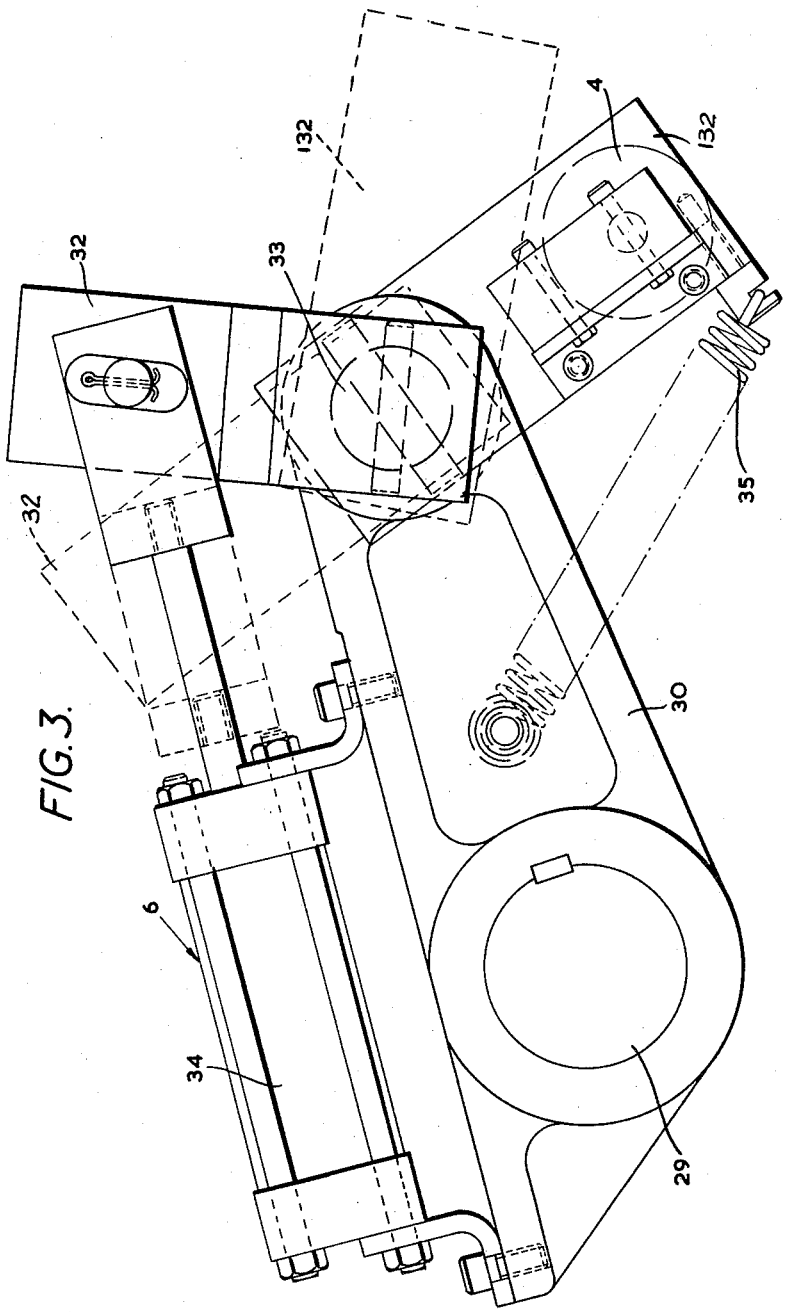

Oct. 5, 1965 A. HOLMES 3,209,627
MACHINE TOOLS
Filed Sept. 7, 1961 11 Sheets-Sheet 3

INVENTOR
ALFRED HOLMES
BY Irvin S. Thompson
ATTY.

Oct. 5, 1965  A. HOLMES  3,209,627
MACHINE TOOLS
Filed Sept. 7, 1961  11 Sheets-Sheet 7

INVENTOR
ALFRED HOLMES
By Irwin S. Thompson
ATTY.

Oct. 5, 1965 A. HOLMES 3,209,627
MACHINE TOOLS
Filed Sept. 7, 1961 11 Sheets-Sheet 9

INVENTOR
ALFRED HOLMES
BY Irwin S. Thompson
ATTY.

Oct. 5, 1965   A. HOLMES   3,209,627
MACHINE TOOLS

Filed Sept. 7, 1961   11 Sheets-Sheet 11

INVENTOR
ALFRED HOLMES
BY Irwin S. Thompson
ATTY.

United States Patent Office 3,209,627
Patented Oct. 5, 1965

3,209,627
MACHINE TOOLS
Alfred Holmes, Coventry, England, assignor to Birfield Engineering Limited, London, England
Filed Sept. 7, 1961, Ser. No. 137,474
1 Claim. (Cl. 82—2.7)

This invention relates to machine tools of the multi-spindle automatic type, and is particularly concerned with methods of controlling such machine tools and control means therefor.

Multi-spindle automatics are normally charged with fresh bar stock by hand and such charging, especially when working on short machining cycles with long parts, occupies a considerable percentage of the total machining time. The automatics normally have an indexing head incorporating the spindles which are indexed in turn to a parting-off station at which the corresponding bar is released by the spindle collet after parting-off and then fed forwardly by associated feed fingers before being again gripped by the collet for the commencement of the machining cycle.

It has been proposed to load a multi-spindle automatic automatically, the automatic being controlled so that failure of a bar at the parting-off station to be fed into engagement with a feed stop sets in motion a charging operation in which a fresh bar is fed to the spindle at this station. Charging of the fresh bar ejects the slug end of the previous bar, and the fresh bar is fed by the charging mechanism into engagement with the stop after which it is gripped by the corresponding collet. This proposal possesses the disadvantage that the bars fed to the machine must be of a precise length so that the slug end can be ejected by a freshly loaded bar without fouling the feed stop.

The main object of the present invention is to provide a method and means for controlling a multi-spindled automatic in which the spindles are automatically loaded with bars which can be of random lengths.

According to the invention a method of controlling a multi-spindle automatic comprises the steps of disengaging the main camshaft of the automatic, in dependence upon failure of the bar at the parting-off station to be fed into engagement with a feed stop, retracting the feed stop to an inoperative position, charging the spindle at that station with a fresh bar and feeding the latter into the collet until the front end of the bar reaches a given position suitable for facing-off by the parting-off tool and thereafter returning the feed stop to its operative position and re-engaging the camshaft.

Preferably the freshly charged bar is fed forwardly until its leading end reaches a fixed position, and is thereafter fed forwardly through a further predetermined distance to bring it to said given or facing-off position.

A control circuit which automatically effects the above steps in the required sequence is preferably energised from the camshaft during each parting-off operation, energisation of this circuit being cancelled or the circuit rendered effective according to whether or not the bar being parted-off is ultimately fed into engagement with the feed stop by the usual feed fingers of the automatic.

Control means for a multi-spindle automatic, according to the invention, comprise a control circuit operative to detect failure of a bar after parting-off to be fed forward into engagement with a feed stop and, as a result, to disengage the main camshaft and move the stop to an inoperative position, charge the corresponding spindle with a fresh bar and feed the latter forwardly to a short feed position, and thereafter re-engage the camshaft and re-position the feed stop.

The control means may incorporate a timing section which is rendered operative when the means detect failure of the exhausted bar to reach the feed stop under the action of the feed fingers of the automatic. This timing section provides a delay to ensure that the fresh bar is fully charged before being fed forwardly into the collet and thus ensures that fouling will not occur as a result of an attempt to feed the bar before it is aligned with the collet.

Preferably the arrangement is such that the freshly charged bar is fed forwardly to an initial position at which its leading end trips a short feed control section of the control means, this section then being operative to feed the fresh bar to said short feed position at which it is faced-off during the next machine cycle.

Conveniently the control means are electro-pneumatic in operation, such operation being controlled by trip and limit switches energising electromagnetic relays controlling solenoid valves.

It will be appreciated that a multi-spindle automatic controlled in accordance with the invention can be charged with rods of random lengths. Whatever the length of the slug end of an exhausted bar it can be ejected forwardly past the stop by the fresh bar; variations in length of the latter will not affect the facing-off positon at which it is gripped by the corresponding collet.

The invention will now be described with reference to the accompanying drawings which illustrate, by way of example, a multi-spindle automatic with control means in accordance with the invention, and in which:

FIGURE 1 is a general arrangement side view of the automatic,

FIGURE 2 is a fragmentary plan view,

FIGURES 3 to 10 are detail views identified in the following description,

FIGURE 12 is a diagrammatic layout of various electrical switches of the control means, and FIGURE 13 is a schematic layout view of an associated pneumatic circuit of the control means, again showing the positions of the related electrical switches.

Figure 4:
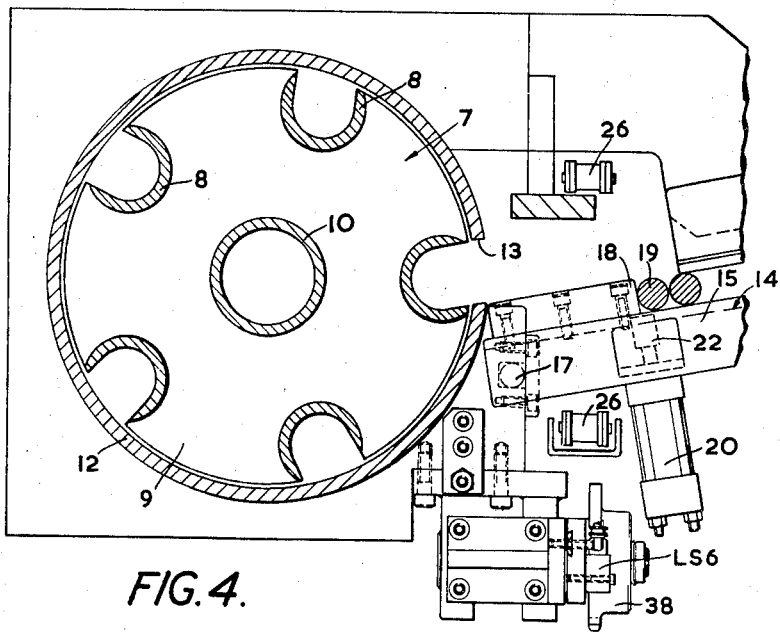

The conventional main structure of the automatic is illustrated in outline only at 1 in FIGURE 1, in general only the additional features provided by the invention being illustrated in detail.

The automatic 1 comprises a rotary indexing head 2 with a plurality of angularly distributed spindles indexed in turn between a corresponding number of tool stations. A main camshaft 3 controls indexing movement of the head 2 and feed of the separate tools (not illustrated) in accordance with a predetermined machining cycle; the camshaft 3 also controls operation of the collet 4 of the spindle at one of the stations at which a parting-off tool is arranged and, when this collet is open, feed fingers of conventional form which are not illustrated and act to feed the bar in this collet forwardly along a corresponding feed tube 5 into engagement with a feed stop 6 (shown in detail in FIGURE 3) at the commencement of each machining cycle.

A stock reel 7 is positioned behind the head 2 for indexing movement therewith and has trough-like bar guides 8 individually aligned with the spindles and along which the bars are fed by the feed fingers. The construction of the stock reel 7 is shown more particularly in FIGURE 4, which is a sectional view of the reel generally on the line IV—IV in FIGURE 1. As shown in that figure, the real comprises a plurality of spaced coaxial notched discs such as 9 in the notches of which the guides 8 are mounted, and the discs 9 are themselves mounted on a coaxial rotary shaft 10. The reel 7 is mounted within a fixed cylindrical casing 12 which has an axially directed slit-like opening 13 adjacent the parting-off station and which at all other machining stations closes the guides 8 to retain the bars therein except when aligned with the parting-off station and hence in register with the opening 13.

Figure 5:
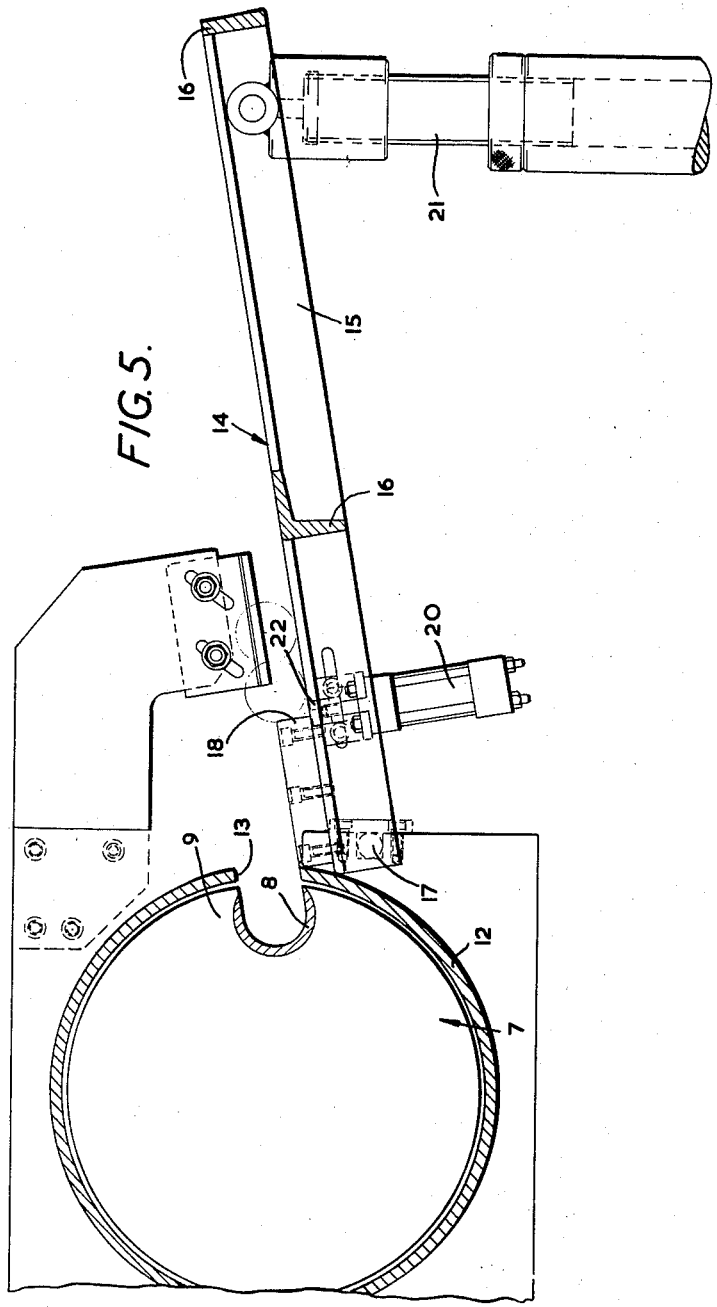

Alongside the opening 13 there is arranged an inclined stock ramp 14, see particularly FIGURES 2 and 4 and also FIGURE 5 which is a somewhat diagrammatic typical lateral cross-sectional view through the reel 7 and the ramp 14. The ramp 14 comprises a plurality of spaced transverse members such as 15, joined by longitudinal members 16, and is attached to the casing 12 at points such as 17 which allow the inclination of the ramp to be set at a desired value by adjustable jack pedestals 21 (omitted from FIGURE 1). A step 18 along the lower edge of the ramp 14 supports a layer of fresh stock bars such as 19 on the ramp.

Five spaced pneumatic lifting cylinders 20 with pistons attached to short lifting bars 22 are arranged immediately in front of the step 18 and, when actuated by the control means in a manner described hereinafter, lift the lowest bar 19 on the ramp 14 above the step 18 so that it can roll through the opening 13 into the giude 8 in register therewith to charge the latter. On retraction of the lifting bars 22 the stock bars 19 on the ramp 14 roll down to the step 18 ready for the next charging operation.

A pusher 23 arranged to feed the freshly charged bar 19 towards the corresponding collect 4 projects through the opening 13 and normally occupies a position at the rear end of the casing 12 clear of the stock reel 7. The arrangement of the pusher 23 is illustrated more particularly in FIGURE 6 which is a somewhat diagrammatic detail side view of the rear end of the apparatus, and in FIGURE 7 which is a general lateral sectional view taken in a plane disposed rearwardly of the pusher 23. The pusher 23 is mounted on guides 24 alongside the casing 12 and is driven by an electric motor 25 through an endless chain 26 to which it is fixed. The motor 25 is controlled by the control means in a manner described hereinafter, and the chain 26 is driven by a sprocket 27 forming part of the motor drive and around which the chain 26 passes.

Figure 6:
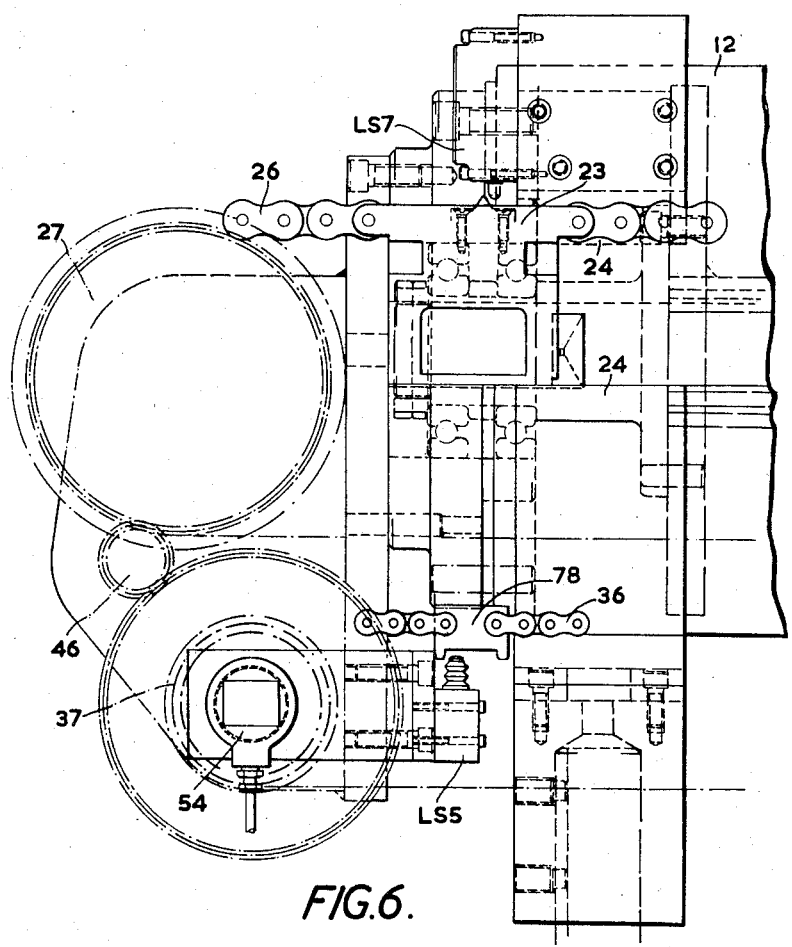
Figure 7:
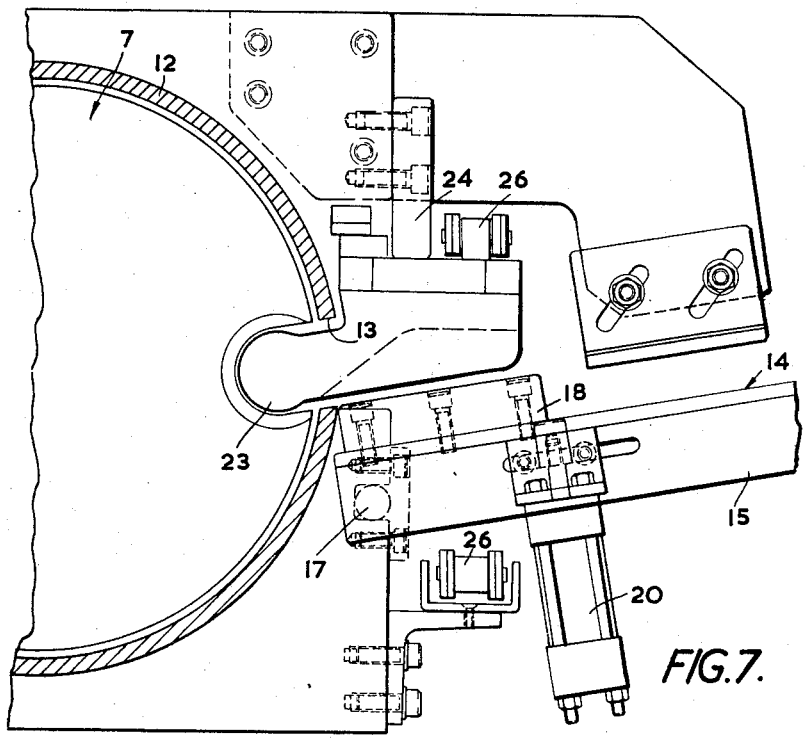
Figure 8:
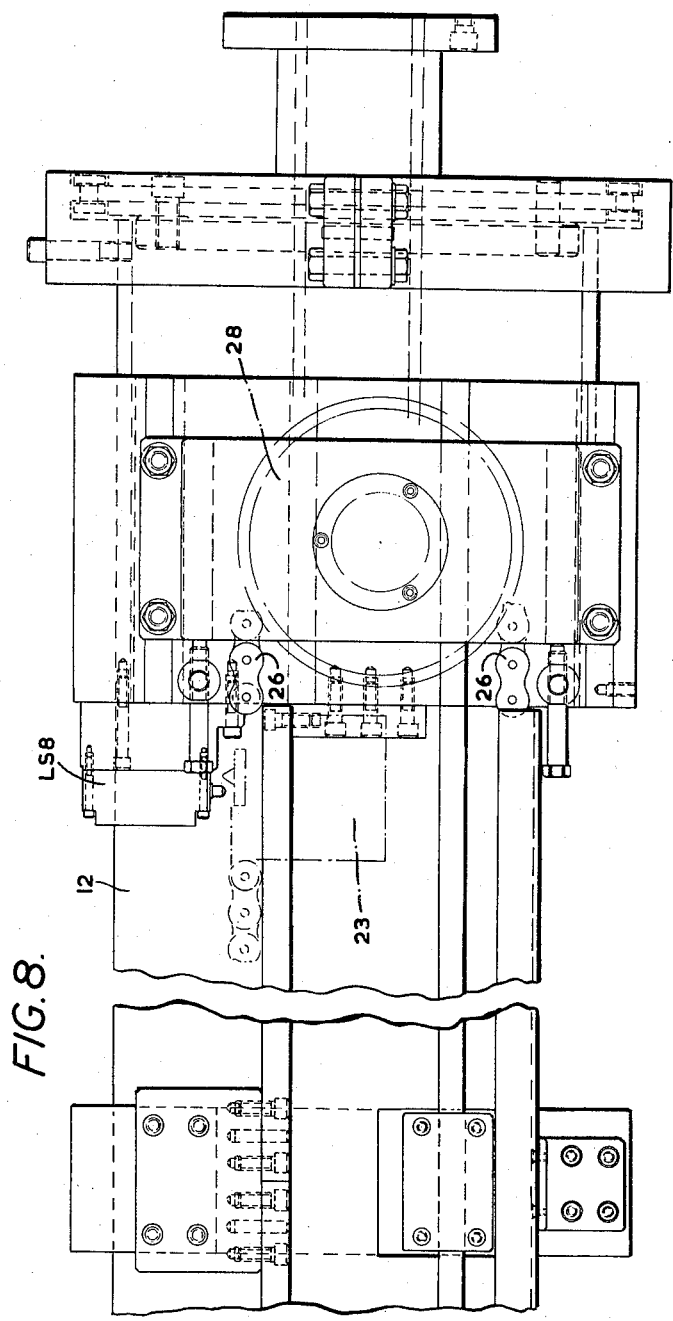

At the front end of the casing 12 the chain 26 passes around an idler sprocket 28, as shown more particularly in FIGURE 8 which is a side view of the front end of casing 12 whose rear end is shown in FIGURE 6.

Referring back to FIGURE 3, the feed stop 6 is of the swinging variety mounted on a rock shaft 29 operated from the main camshaft 3 in the conventional manner. During the machining cycle the stop 6 is swung aside on the shaft 29, but immediately prior to a feeding operation of the feed fingers the shaft 29 and with it the stop 6 are swung to the operative position shown in FIGURE 3. In that figure the stop 6 is aligned with the collet 4 at the parting-off station.

The stop is modified, for the purposes of the invention, by forming it in two sections pivoted together at 33. One section comprises a main arm 30 keyed to the rockshaft 29 which is actuated cyclically by the main camshaft. The other section comprises two arms 32 and 132 rigidly attached together to form a bell-crank lever and pivotally mounted on arm 30 at the pivot 33. The arms 132 and 32 can be swung aside, to the position shown in broken lines in FIGURE 3 clear of the corresponding collet whose position is indicated at 4, by a pneumatic cylinder 34 against a return spring 35 even though the rock shaft 29 is in the operative position shown. The cylinder 34 is controlled in a manner described hereinafter. Thus there are provided two independent mechanisms for controlling the stop.

Figure 9:
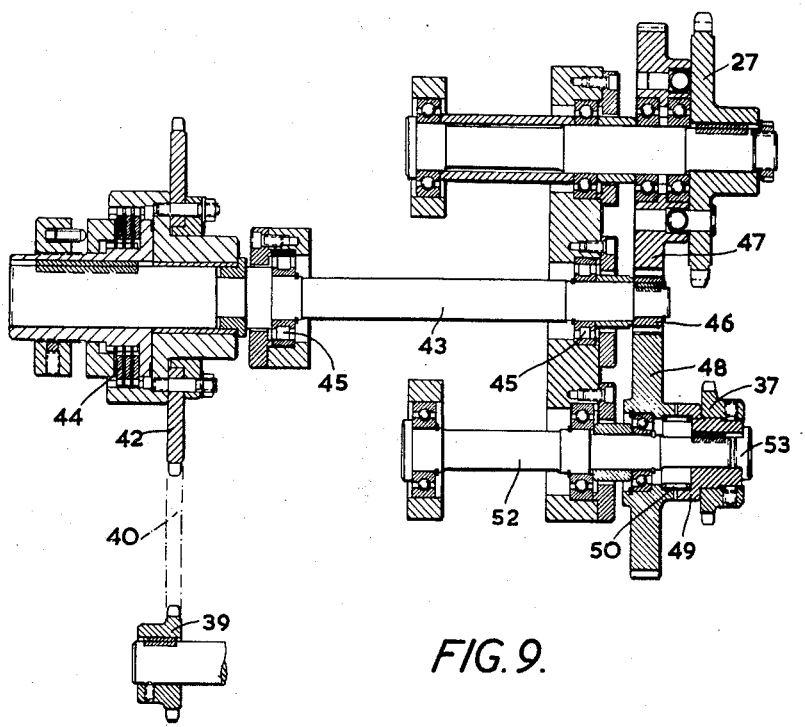
Figure 10:
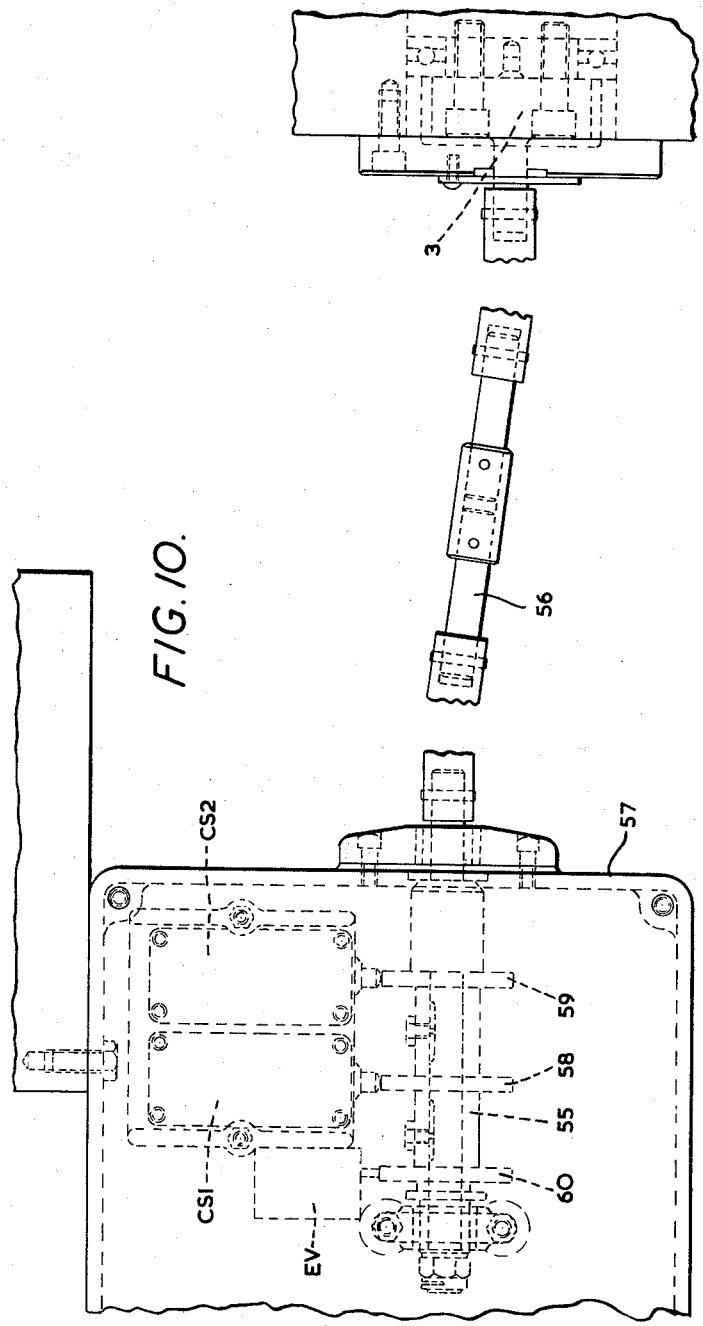

Short feed metering means, operative to ensure that a freshly charged bar 19 is moved by the pusher 23 to a predetermined short feed position, comprise a separate short feed chain 36 (see FIGURES 1, 6, 12 and 13) between sprockets 37 and 38. Referring particularly to FIGURE 9, which illustrates in section the motor drive, a drive sprocket 39 mounted on the shaft of the motor is coupled by a chain 40 to a driven sprocket 42 mounted on an intermediate shaft 43 and coupled to the latter through an overload clutch 44. The shaft 43 is mounted in spaced bearings 45 and carries at its outer end, remote from the driven sprocket 42, a pinion 46 meshing with upper and lower gearwheels 47 and 48.

The gearwheel 47 is coupled to the sprocket 27 which drives the pusher chain 26, and the gearwheel 48 is normally free running but can be coupled to the sprocket 37 of the short feed chain 36 by a dog clutch 49. A clutch spring 50 urges the dog clutch 49 to the disengaged position shown in FIGURE 9, and the latter can be moved with the sprocket 37 along a rotatable shaft 52 into clutching engagement with the gearwheel 48 for a purpose described hereinafter. This clutching movement is produced by a thrust pad 53, movable by a pneumatic actuator or short feed cylinder 54 shown in FIGURES 6 and 13. When the dog clutch is engaged, the motor drive is coupled simultaneously to the pusher chain 26 and the short feed chain 36.

The control means is electro-pneumatic in operation and includes an auxiliary camshaft 55 driven from the main camshaft 3 through a short drive shaft 56. The camshaft 55 is mounted in a cam box 57 and comprises three cams 58, 59 and 60. The cams 58 and 59 respectively operate camshaft switches CS1 and CS2 and the cam 60 operates an exhaust valve EV for a purpose described hereinafter. During each parting-off operation the main camshaft 3, in the normal manner, acts to open the collet 4 and causes the feed fingers to feed the parted-off bar fowardly into engagement with the feed stop 6 ready for the next machining cycle.

Figure 11:
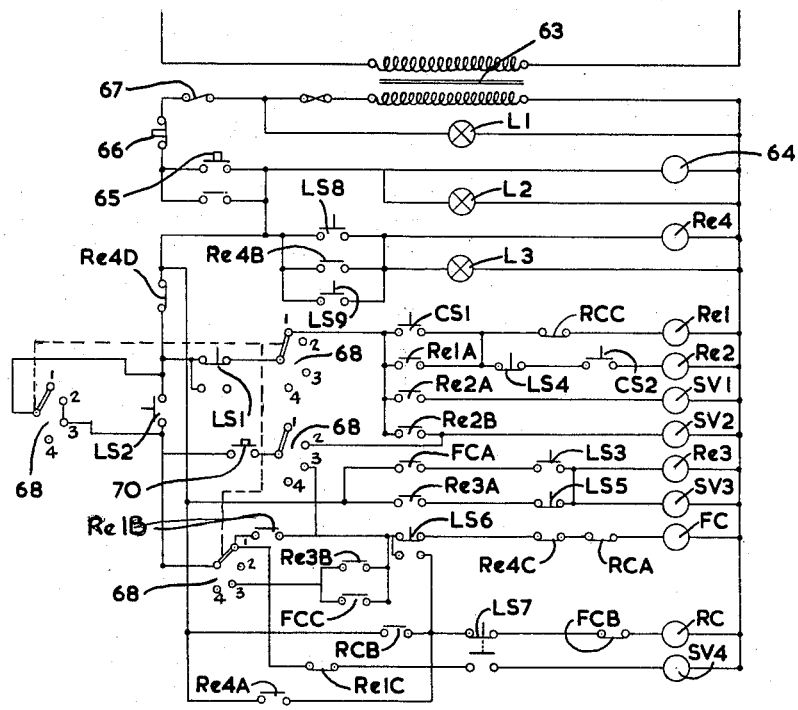
FIGURE 11 is a schematic electrical circuit diagram of the control means.

A cabinet 62 houses the electrical control gear and the latter, with particular reference to FIGURE 11, is energized through an isolating transformer 63 which also supplies the main machine contactor 64 under the control of a machine start button 65. A pilot light L1 indicates that the transformer 63 is live and a pilot light L2 indicates that the machine is running. The starting circuit also includes a stop button 66 and overload trip 67.

The main control circuit is supplied from the starting circuit and includes four ganged selector switches 68 each of which has four positions, marked 1, 2, 3 and 4 in FIGURE 11. In position 1, as shown in that figure, the control means are set for automatic operation and a fresh bar is loaded automatically when a bar being machined is exhausted. The remaining switch positions are used when setting up and provide non-automatic control, and in position 2 bar loading is controlled manually under the control of a manual control switch 70 which operates the bar lifting cylinders 20; in position 3 operation of the manual switch 70 acts to move a charged bar forwardly into the collet 4; and in position 4 the control means is completely inoperative.

The automatic operation of the control circuit will now be described. During each parting-off operation the cam 58 closes CS1 which is in series with the operating coil of a relay R$e$1 which is then energised through a normally closed limit switch LS1 built into the feed stop 6 in a position such that it is opened when a bar fed forwardly engages that stop. Energisation of R$e$1 closes a contact R$e$1A in series with a further relay R$e$2 which, however, is not energised until the normally open switch CS2 is closed at a later stage by the cam 59.

At the end of the parting-off operation the camshaft 3, in the normal manner, acts to open the collet 4 and causes the feed fingers to feed the parted-off bar forwardly into engagement with the feed stop 6. This opens LS1, which thus acts as a cancelling switch, to de-energize R$e$1 whereupon contacts R$e$1A drop out and R$e$2 is rendered ineffective. With both these relays de-energised the control means is completely ineffective and the automatic continues its normal machining cycle, there being no need for charging of a fresh bar. As a safeguard that a new bar will not be charged until the old bar has cleared the stock reel a safety switch LS4, described later, is fitted which is held open if a reasonable length of bar remains. This switch is also in series with R$e$1A and CS2 and when open prevents energisation of R$e$2.

If the bar at the parting-off station is in effect exhausted and does not reach the stop 6, LS4 has previously closed and now LS1 remains closed and R$e$1 energised. Further rotation of the camshaft 55 causes cam 59 to close CS2 and thus energise R$e$2. This occurs during the portion of the machine cycle when the collect 4 is still open and just before collet closure, the open period of the collet being shown shaded in FIGURE 12 as a function of camshaft rotation.

Energisation of R$e$2 closes normally open contacts R$e$2A and R$e$2B which respectively energise solenoid valves SV1 and SV2. Operation of SV1 applies pneumatic pressure, see particularly FIGURE 13, to three pneumatic circuits; these respectively control a pneumatic cylinder 72 which moves a main camshaft control lever 73 to the off position to stop the main camshaft 3 so that normal machine operation is interrupted, the cylinder 34 which swings the feed stop 6 to an inoperative position as already described so that it does not impede forward ejection of the slug end of the exhausted bar, and a timing section which now comes into operation. This timing section includes a timing cylinder 74 fed through SV1 and exhausted through a flow regulator 75 which thus controls the speed of movement of the piston rod 76 of the cylinder 74. At the end of its outward movement the piston rod 76 acts to close a limit switch LS2 for a purpose described hereinafter. Operation of SV2 applies pressure air to the five lifting cylinders 50 through a flow regulator 77, and these cylinders thus act at a controlled rate to lift a fresh bar 19 over the step 18 into the stock reel 7 behind the slug end.

The timing section produces a preset time delay before LS2 is closed, and this delay is set to be sufficient to ensure that the fresh bar has been charged into the corresponding guide 8 before LS2 is closed. Closing of LS2 energises a forward contactor FC through normally-open contacts R$e$1B of the relay R$e$1 which is now energised. This switches on the motor 25 which drives the pusher 23 forward to feed the newly charged bar 19 into the feed tube 5 towards the collet 4.

As the leading end of the fresh bar 19 reaches a fixed position forward of the stock reel it trips a compound limit switch comprising, in effect, a normally-open limit switch LS3 and the aforesaid normally-closed limit switch LS4. Actuation of LS3 energises a relay R$e$3 through normally-open contacts FCA of the contactor FC which is now energised, and this closes normally-open contacts R$e$3A of the relay R$e$3 to energise short feed solenoid valve SV3. Energisation of SV3 supplies pressure air to the cylinder 54 which engages the dog clutch 49, so that the short feed chain 36 is driven during the remaining forward movement of the fresh bar 19 with the pusher 23. Attached to the short feed chain 36 is a trip element 78 which at the limits of its movement respectively operates two limit switches LS5 and LS6. The already described actuation of LS4, which is in series with the operating coil of R$e$2, de-energises R$e$2 so that SV1 and SV2 are de-energised. On de-energisation of SV2 pressure air is supplied to the double-acting lifting cylinders 50 so that the latter retract and allow the next bar 19 on the ramp 14 to move down into engagement with the step 18.

Forward movement of the fresh bar 19 under the action of the pusher 23 continues until it has been fed forwardly through a further predetermined distance to a position suitable for facing-off, and when it reaches that position the trip element 78 operates LS6 to open a set of normally-closed contacts of the latter and de- energise FC to stop further forward movement of the motor 25. Deenergisation of FC allows normally-closed contacts FCB thereof in series with a reverse contactor RC to close, and the latter is energised through a set of normally-open contacts of LS6 closed by operation of the latter to start reverse movement of the motor 25. Normally closed contacts RCA of the contactor RC in series with FC provide with FCB an interlock which prevents simultaneous energisation of FC and RC.

Reversal of the motor 25 produces return movement of the pusher 23 with the chain 26, leaving the fresh bar 19 in its short feed position; as the short feed clutch 49 is still engaged the chain 36 and trip element 78 are also returned to the resting position. The contactor RC has hold-on contacts RCB in parallel with LS6, and at an intermediate stage of the return movement the element 78 operates normally-closed LS5 to de-energise R$e$3 and SV3, contacts FCA now being open. On de-energisation of SV3 the short feed cylinder 54 exhausts under the action of a return spring 79 to free the clutch 49 whereupon return movement of the short feed chain 36 ceases.

The motor 25 continues running in the reverse direction and takes the pusher 23 back to its normal rearward resting position at which a projection on the pusher actuates a pusher return limit switch LS7 which has a set of normally-closed contacts in series with the contactor RC which is de-energised to switch off the motor 25. Operation of LS7 closes a normally-open contact set thereof to energise solenoid valve SV4. This supplies pressure air through the regulator 75 to produce return movement of the timing cylinder 74, thus resetting LS2, to the stop cylinder 34 to return the feed stop 6 to its normal condition, an dalso through the valve EV to operate the camshaft cylinder 72 to return the lever 73 to the on position which restarts the automatic. EV is arranged to be operated by the cam 60 shortly after the main camshaft restarts, and operation of EV leaves the cylinder 72 fully exhausted so that the camshaft lever 73 can be operated manually if it is desired to stop the machine at any time during the machining cycle. Resetting of EV is effected pneumatically when the cylinder 72 is moved to the off position under the control of SV1.

The normal machining cycle commences when the lever 73 is returned to the on position and is repeated until a bar again fails to feed forwardly into engagement with the short feed stop 6. When this happens a further charging cycle for a fresh bar is automatically initiated. As usual, the first complete machining cycle on a new bar faces-off the latter ready for the next machining cycle.

A normally-closed contact set R$e$10 in series with the normally-open contacts of LS7 ensures that SV4 cannot be energised to start the machine as long as R$e$1 is still energised, and a safety limit switch LS8 is provided which is engaged by the pusher 23 when the latter reaches the forward end of its maximum movement. Operation of LS8 energises a relay R$e$4 to close normally-open contacts R$e$4A to energise RC and bring about reverse movement of the pusher; at the same time a pilot light L3 indicates that a short bar has been charged. A further safety limit switch LS9 is positioned behind the short feed stop 6, so that if the fresh bar 19 by chance overruns the short feed position this switch which is wired in parallel with LS8 will be operated to reverse the motor 25. The relay R$e$4 has its own hold-on contact set R$e$4B.

A normally-closed contact set R$e$4C of R$e$4 in series with the operating coil of FC ensures that when R$e$4 is energised forward drive of the motor is impossible. In addition opening of normally-closed contacts R$e$4D isolates all the control circuit except the motor reverse section. In particular the circuit of SV4 which acts to restart the machine is isolated. It is thus impossible to operate the machine until the control circuit has been reset by de-energising R$e$4, and in view of the hold-on contacts R$e$4B this can only be done by operating the main stop button 66 causing the main contactor 64 to drop out. The machine must now be restarted by use of the start button 65.

As shown in FIGURE 13, pressure air is supplied to the pneumatic circuit through a filter 82, a pressure regulator 83 and a lubricator 84. A pressure gauge 85 allows the pressure to be set to the desired operating value by the regulator 83.

From the preceding description of automatic operation the manual operation in alternative positions 2 and 3 of the ganged switched 68 will, it is believed, be clear. In particular, one of these switches shorts out LS2 so that in position 2 the button 70 directly controls SV2 and hence the lifting cylinder 50. In position 3, the button 70 directly controls FC and hence forward movement of the pusher. Normally-open contact sets R$e$3B and FCC, of R$e$3 and FC respectively, are in this position arranged in parallel with the button 70 to ensure that when the latter is released normal forward pusher movement, including short feeding, will occur.

I claim:

A multi-spindle automatic, comprising an indexing head, a plurality of rotary spindles mounted on parallel axes in said head, means for indexing the head, bar feed mechanism associated with each spindle, a main cam shaft operatively connected with said indexing means and with said bar feed mechanism to operate the same in timed relationship, bar loading mechanism mounted parallel with the axes of the rotary spindles and in line with one selected spindle position, a feed stop mounted in line with the bar loading mechanism on the side of the indexing head remote from said bar loading mechanism, a swinging link on which the feed stop is mounted, an arm on which the swinging link is mounted and which is attached to a rock shaft, the main cam shaft being operatively connected to said rock shaft to cause rocking movement thereof, switch means connected to said feed stop to detect the presence of a bar, feed stop control means including a fluid operated motor connected between said swinging link and said arm to cause swinging movement of said link relatively to said arm whereby the feed stop can be moved to an inoperative position independently of the position of said rock shaft, a control circuit including said switch means and responsive to failure of a bar to be fed forward into engagement with said feed stop, said control circuit including timing means and being operatively associated with said main cam shaft and with said control means and with said bar loading mechanism sequentially to disengage the main cam shaft, to actuate the control means so as to move the feed stop to an inoperative position, to energise the bar loading mechanism so as to load a fresh bar, and thereafter to re-engage the cam shaft and deactuate the control means to reposition the said feed stop.

References Cited by the Examiner
UNITED STATES PATENTS

| | | | |
|---|---|---|---|
| 2,043,772 | 6/36 | Rich | 29—44 |
| 2,595,522 | 5/52 | Harney | 82—2.7 X |
| 2,646,087 | 7/53 | Jobert | 205—4 X |
| 3,038,636 | 6/62 | Hamilton | 29—37 X |

WILLIAM W. DYER, Jr., *Primary Examiner.*